Figure 1:
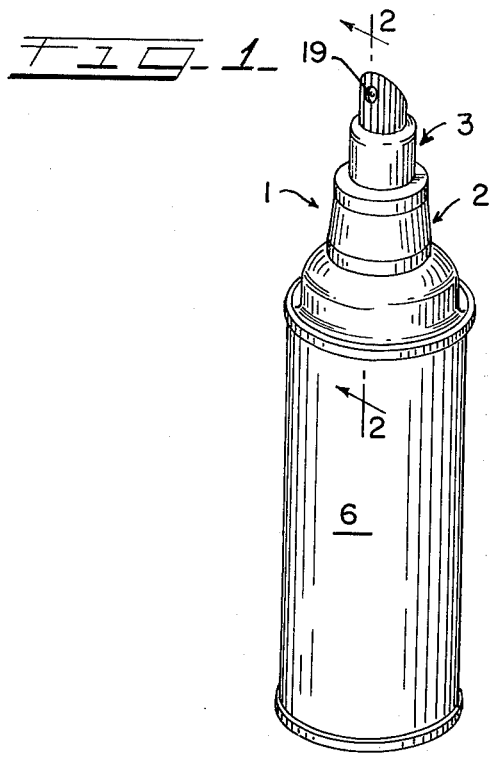
Figure 2:
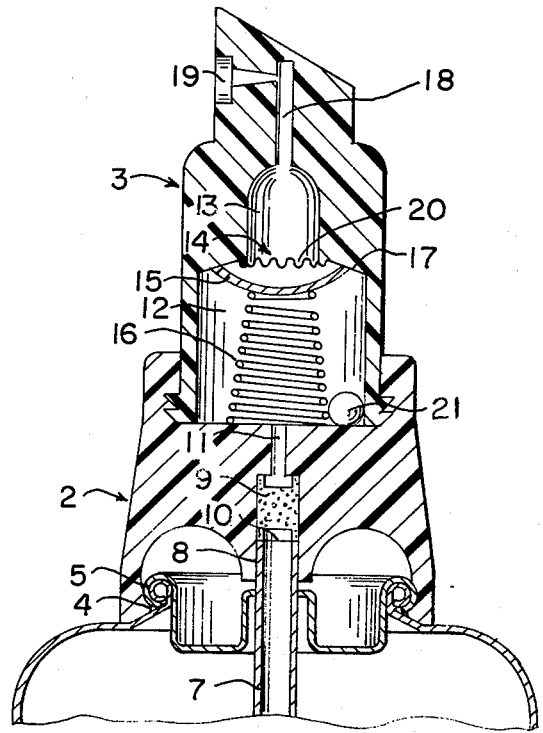
Figure 3:
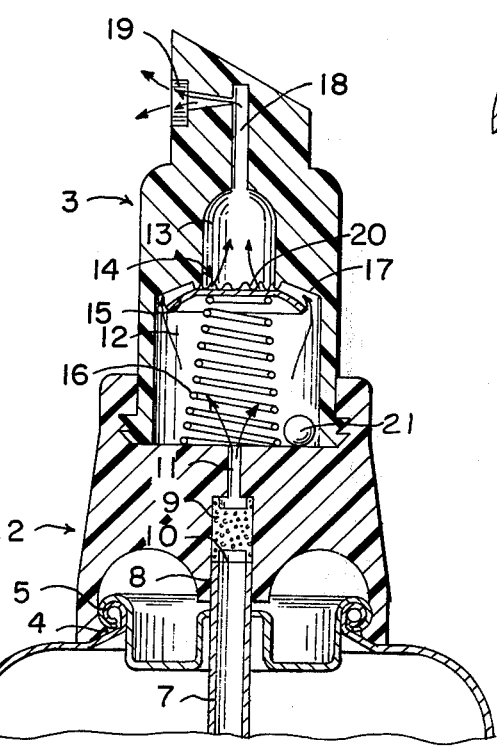

United States Patent [19]
Pelton

[11] 3,968,905
[45] July 13, 1976

[54] TIME RELEASE AEROSOL DISPENSER

[75] Inventor: Peter G. Pelton, Carol Stream, Ill.

[73] Assignee: Continental Can Company, Inc., New York, N.Y.

[22] Filed: Aug. 7, 1975

[21] Appl. No.: 602,718

[52] U.S. Cl. ............................... 222/70; 137/525; 222/477; 222/498; 251/75
[51] Int. Cl.² .......................................... B67D 5/08
[58] Field of Search ............... 222/498, 70, 477; 137/525; 251/75

[56] References Cited
UNITED STATES PATENTS

| | | | |
|---|---|---|---|
| 2,695,766 | 11/1954 | Peltz | 222/70 X |
| 2,991,911 | 7/1961 | Spain | 222/70 X |
| 3,477,613 | 11/1969 | Mangel | 222/70 |
| 3,542,248 | 11/1970 | Mangel | 222/70 |

*Primary Examiner*—Allen N. Knowles
*Assistant Examiner*—Hadd Lane
*Attorney, Agent, or Firm*—John J. Kowalik; Joseph E. Kerwin; Paul J. Lerner

[57] ABSTRACT

Timed release of measured quantities of an aerosol spray is accomplished by attachment of an improved dispenser to a conventional aerosol container. The contents of the container are controllably passed through a porous sintered plug and a flow restricting orifice into a measuring chamber in the body of the dispenser. The exit passage of this chamber is sealed by a spring disk which is concave upward with its periphery seated against a shoulder encircling the exit orifice. As the container contents enter the chamber, the pressure therein rises until it is sufficient to overcome the spring resistance of the disk. When this occurs, the disk snaps into its stressed condition, assuming a concave downward shape. It is then supported on projections formed on the exit orifice shoulder. These projections retain the stressed disk in spaced relation to the exit orifice and allow a quantity of the chamber contents to pass around the disk and escape through a nozzle mounted on the exit orifice. As the chamber contents escape, the pressure within the chamber diminishes until the disk snaps back to its original shape. The cycle is then repeated.

4 Claims, 3 Drawing Figures

U.S. Patent  July 13, 1976  3,968,905

TIME RELEASE AEROSOL DISPENSER

SUMMARY OF THE INVENTION

The present invention relates to aerosol containers and, more particularly, to the timed release of measured quantities of contents therefrom.

Timed release of measured quantities of aerosol sprays is a highly effective means of applying various household chemicals such as deodorizers, disinfectants, pesticides and the like. Currently, such application can only be effected through the use of electronic timing and measuring equipment. This equipment, however, is of limited utility in that it is expensive and requires the presence of an electrical current source. It is, therefore, one of the important objects of the present invention to provide an improved dispenser for the timed release of measured quantities of aerosol sprays.

It is a further object to provide an improved dispenser which is inexpensive and which will operate in the absence of a source of electrical energy.

It is another object to provide an improved dispenser which may be reuseably attached to a standard aerosol container.

With the above and other objects in view that will hereinafter appear, the nature of the invention will be more readily understood by reference to the following description, the appended claims and the several views illustrated in the accompanying drawings.

IN THE DRAWINGS

FIG. 1 is a perspective view of an aerosol container having in association therewith a dispensing device which is representative of the present invention.

FIG. 2 is a fragmentary enlarged sectional view taken substantially along line 2—2 of the dispensing device shown in FIG. 1, illustrating the valve in the closed position.

FIG. 3 is a view similar to FIG. 2, illustrating the valve in the open position.

DESCRIPTION OF THE PREFERRED EMBODIMENT

As shown in the drawings, the aerosol dispenser 1 of this invention includes a lower body portion 2 and an upper body portion 3.

The lower body portion 2 is formed with an inwardly turned peripheral lip 4 which engages the valve cup lip 5 of a standard aerosol container 6 thereby securely fastening the dispenser 1 to the container 6. The container valve stem 7 projects into a mating recess 8 located along the axis of symmetry of the dispenser 1. A sintered filter 9 contained within a filter housing 10 is mounted in the recess 8 upstream of the valve stem 7. A restrictor orifice 11 connects the outlet end of the filter housing 10 and the measuring chamber 12 in the upper body portion 3.

The upper body portion 3 is formed with a measuring chamber 12 surmounted by an outlet chamber 13. The interchamber orifice 14 is sealed by a spring disk 15 which is supported on a spring 16. The disk 15 is concave upward in shape with its periphery seated against a shoulder 17 encircling the interchamber orifice 14 (FIG. 2). A passageway 18 connects the outlet chamber 13 with a spray nozzle 19.

In operation, the nozzle which is normally found atop the valve stem 7 of a standard aerosol container, is removed and the dispenser 1 is snapped into place with the lower edge of the filter housing 10 depressing the valve stem 7 and thereby opening the container valve (not shown). The contents of the container thereupon travel up the valve stem 7 through the filter 9 and the restrictor orifice 10 and into the measuring chamber 12. As the container contents enter the measuring chamber 12, the pressure therein rises until it is sufficient to overcome the spring resistance of the disk 15. When this occurs, the disk 15 snaps into its stressed condition, assuming a concave downward shape (FIG. 3). In this condition, it is supported on projections 20 formed on the interchamber orifice shoulder 17. These projections retain the stressed disk 15 in spaced relation to the orifice 14 and allow a quantity of the chamber contents to pass around the disk 15 and enter the outlet chamber 13. From the outlet chamber 13, the contents pass through the passageway 18 and exit through the spray nozzle 18. As the contents of the measuring chamber 12 escape, the pressure within the chamber 12 diminishes until the disk 15 snaps back to its original unstressed shape (FIG. 2). The cycle is then repeated.

It has been found that problems in cycle timing resulting from the incompressibility of the system operating fluid (the contents being dispensed) may be overcome by the provision of a compressible member 21, as, for example a hollow, air-filled elastomeric sphere, in the measuring chamber 12.

The quantity of spray dispensed and the dwell time between sprays if a function of:

1. Product viscosity and operating pressure;
2. Filter 9 condition;
3. Restrictor orifice 11 size;
4. Measuring cylinder 12 volume;
5. Interchamber orifice 14 size;
6. Exit chamber 13 volume;
7. Spring force of the disk 15.

Preliminary results indicate that a 15 oz. aerosol container may be expected to last for approximately 5 weeks with a 5–10 minute interval between sprays.

It should be noted that the time release dispenser of the present invention offers improved safety features over existing electrically actuated dispensers in that container overpressurization due to unintended heating, as when the container is left on a window sill exposed to excessive sunlight, results in more rapid actuation of the dispenser. This serves to vent the container until normal operation pressure is reattained.

I claim:

1. An improved timed release dispenser for use with an aerosol container, said dispenser comprising upper and lower body portions, means on said lower body portion for attachment of said dispenser to said container, a measuring chamber formed in said upper body portion, means for regulating the flow of contents from said containers to said measuring chamber, pressure actuated valve means controlling the outflow from said measuring chamber, said valve means comprising a spring disk and supporting spring mounted within said measuring chamber, an exit chamber formed in said upper body portion, an interchamber orifice connecting said measuring chamber and said exit chamber, a spray nozzle operatively connected with exit chamber, said spring disk being concave upward when in the closed condition and concave downward when in the open condition, said measuring chamber being formed with a shoulder encircling said interchamber orifice and said spring disk when in said closed condition seating thereagainst in sealing relation, and a plurality of spaced projections formed on said shoulder, and said spring disk, when in the open condition, is supported on said projections, the spaces therebetween providing passage between said measuring chamber and said exit chamber.

2. An improved timed release dispenser as described in claim 1, wherein said regulating means comprises a porous filter and a restrictor orifice downstream of said measuring chamber.

3. An improved timed release dispenser as described in claim 2, wherein said attachment means comprises an inwardly turned peripheral lip formed on said lower body portion for mating engagement with the valve cup lip of a standard aerosol container.

4. An improved timed release dispenser as described in claim 3, and a compressible member located within said measuring chamber.

* * * * *